United States Patent
Baughman et al.

(10) Patent No.: US 10,469,398 B2
(45) Date of Patent: Nov. 5, 2019

(54) SELECTING FORECASTING MODEL COMPLEXITY USING EIGENVALUES

(71) Applicant: International Business Machines Corporation, Armonk, NY (US)

(72) Inventors: Aaron K. Baughman, Gaithersburg, MD (US); Guillermo A. Cecchi, Yorktown Heights, NY (US); James R. Kozloski, New Fairfield, CT (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 838 days.

(21) Appl. No.: 14/195,954

(22) Filed: Mar. 4, 2014

(65) Prior Publication Data

US 2015/0254569 A1    Sep. 10, 2015

(51) Int. Cl.
  *H04L 12/911*    (2013.01)
  *G06Q 10/04*    (2012.01)

(52) U.S. Cl.
  CPC .......... *H04L 47/70* (2013.01); *G06Q 10/04* (2013.01)

(58) Field of Classification Search
  CPC ........................ H04L 47/70; G06Q 10/04
  See application file for complete search history.

(56) References Cited

U.S. PATENT DOCUMENTS

| | | |
|---|---|---|
| 7,336,803 B2 | 2/2008 | Mittal et al. |
| 7,375,828 B1 | 5/2008 | Aoyagi et al. |
| 7,398,508 B2 | 7/2008 | Shi et al. |
| 7,870,083 B2 | 1/2011 | Zhu et al. |
| 2005/0021577 A1 | 1/2005 | Prabhu et al. |
| 2009/0279644 A1 | 11/2009 | Maru |
| 2010/0088259 A1 | 4/2010 | Valpola et al. |
| 2011/0246412 A1* | 10/2011 | Skelton ................. G06Q 10/04 706/52 |

(Continued)

OTHER PUBLICATIONS

Bors, Adrian G., and Ioannis Pitas. "Prediction and tracking of moving objects in image sequences." IEEE Transactions on Image Processing 9.8 (2000): 1441-1445.*

(Continued)

*Primary Examiner* — Scott A. Waldron
*Assistant Examiner* — Kevin W Figueroa
(74) *Attorney, Agent, or Firm* — Garg Law Firm, PLLC; Rakesh Garg; James Nock

(57) ABSTRACT

A method, system, and computer program product for selecting forecasting model complexity using eigenvalues are provided in the illustrative embodiments A process is represented in a model. The model comprises a mathematical representation of the process in a certain degree. A first portion of historical data generated by the process during a first period is selected and includes an actual value of an outcome of the process and a value of a feature influencing the process during the first period. A prediction is made of a predicted value of the outcome. A difference between the prediction and the actual value of the outcome is determined. The difference is represented as a change in a distribution of eigenvalues. According to the change, a second model is to represent the process. The second model comprises a second mathematical representation of the process in a different degree.

18 Claims, 6 Drawing Sheets

(56) References Cited

U.S. PATENT DOCUMENTS

2012/0128238 A1* 5/2012 Kameyama ........... G06T 3/4053
   382/159
2014/0040180 A1* 2/2014 Ruhl ................... G06F 17/3089
   706/52
2014/0161309 A1* 6/2014 Chiang .............. G06K 9/00355
   382/103

OTHER PUBLICATIONS

Spiegelhalter, David J., et al. "Bayesian measures of model complexity and fit." Journal of the Royal Statistical Society: Series B (Statistical Methodology) 64.4 (2002): 583-639.*
Ing, Ching-Kang. "Accumulated prediction errors, information criteria and optimal forecasting for autoregressive time series." The Annals of Statistics 35.3 (2007): 1238-1277.*
Yujun et al; Application of Genetic Algorithm in Eigenvalue Extraction of Infrared spectrum and Model Optimization, The Tenth International Conference on Electronic Measurement & Instruments, 194-199, 2011.
Karsmakers et al; Sparse conjugate directions pursuit with application to fixed-size kernel models, Jun. 4, 2011.
Kanamori et al; A Least-squares Approach to Direct Importance Estimation, Journal of Machine Learning Research 10 (2009) 1391-1445, Jul. 2009.
Leng et al; Dynamic Spatial Subcarrier and Power Allocation for Multiuser MIMO-OFDM System, 180-183, IEEE 2007.
Fuzzy Systems (FUZZ), 2010 IEEE International Conference on Digital Object Identifier: 10.1109/FUZZY.2010.5584763, Publication Year: 2010, p. c1.

\* cited by examiner

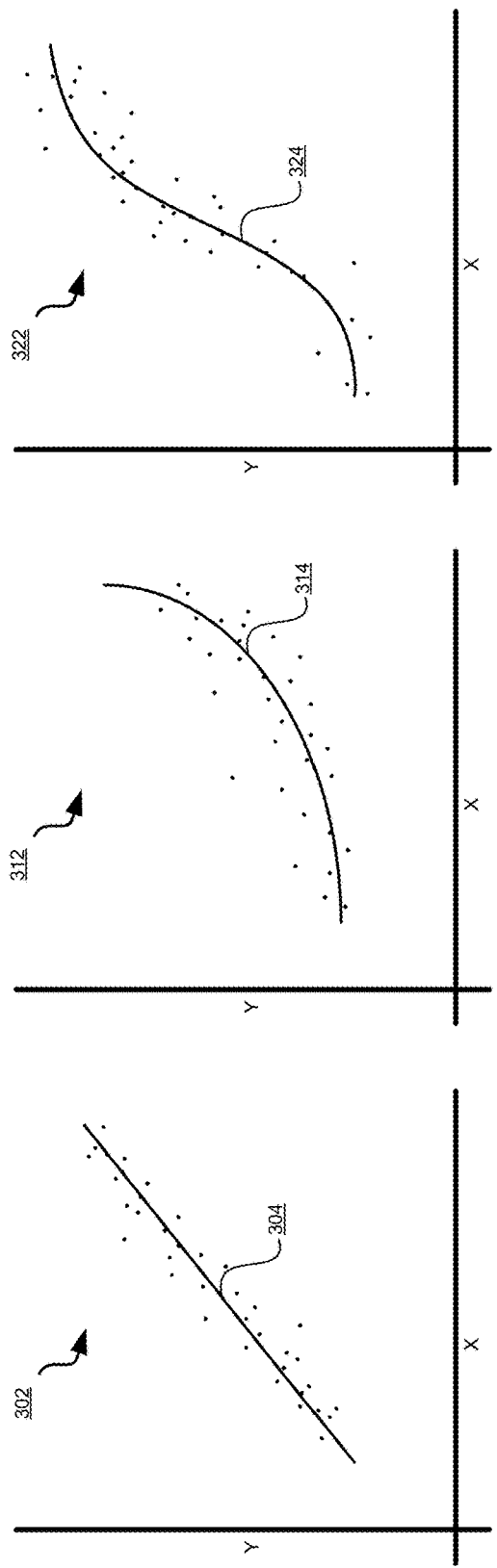

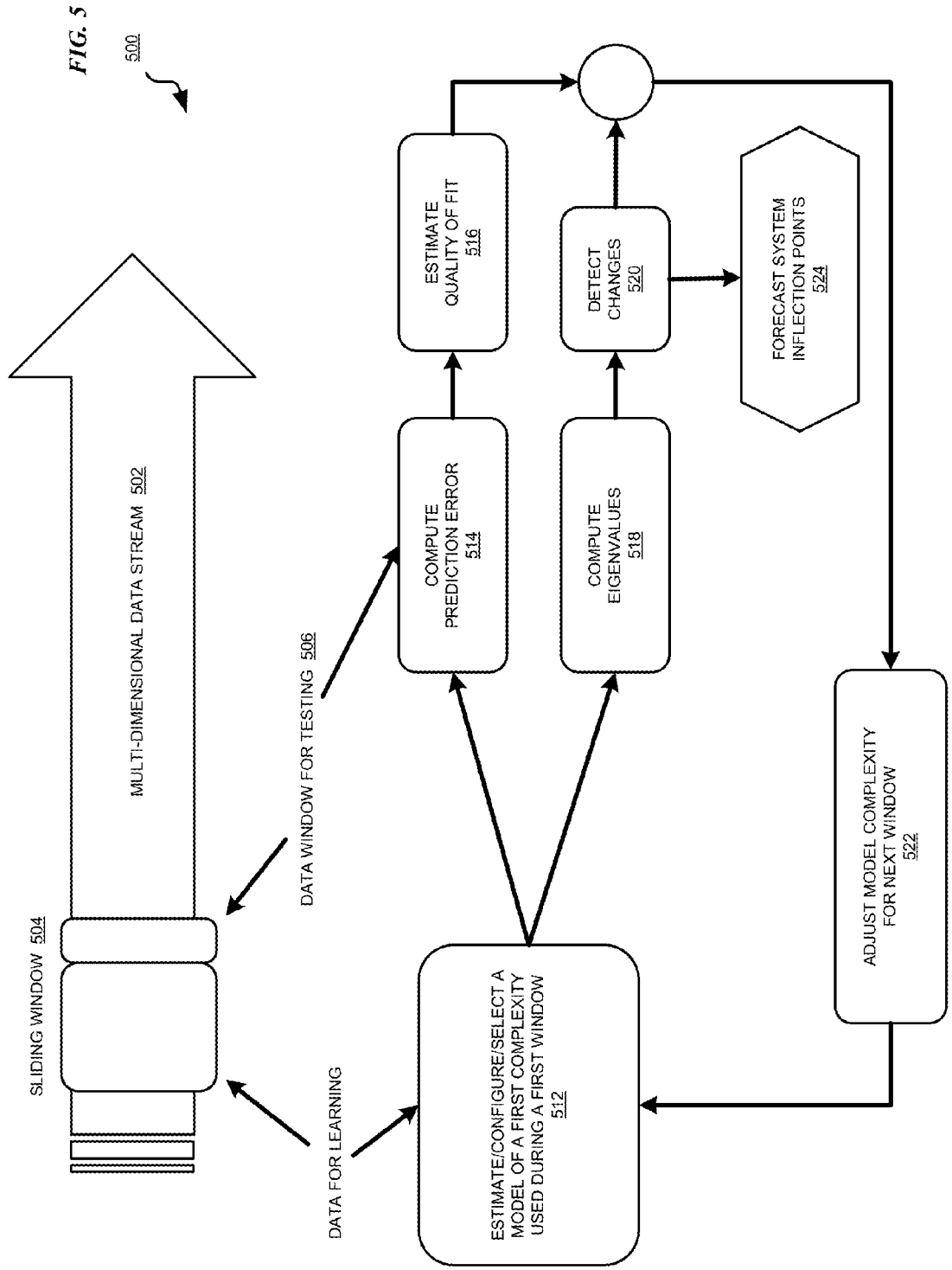

SELECTING FORECASTING MODEL COMPLEXITY USING EIGENVALUES

TECHNICAL FIELD

The present invention relates generally to a method, system, and computer program product for selecting a forecasting model. More particularly, the present invention relates to a method, system, and computer program product for selecting forecasting model complexity and anomaly detection using eigenvalues.

BACKGROUND

A forecasting model (predictive model, autoregressive model) is a software-implemented model of a system, process, or phenomenon, usable to forecast a value, output, or outcome expected from the system, process, or phenomenon. The system, process, or phenomenon that is modeled is collectively and interchangeably referred to hereinafter as a "process" unless specifically distinguished where used. The value, output, or outcome expected from the process collectively and interchangeably referred to hereinafter as an "outcome" unless specifically distinguished where used.

A variable that affects an outcome of a process is called a factor or a feature. An outcome of a process is dependent upon, affected by, or otherwise influenced by a set of one or more factors. A factor can be independent, to wit, independent of and not affected by other factors participating in a given model. A factor can be dependent upon a combination of one or more other independent or dependent factors.

A forecasting model has to be trained before the model can reliably forecast a future outcome of the process within a specified degree of tolerance. Usually, but not necessarily, the training data includes past or historical outcomes of the process. The training process adjusts a set of one or more parameters of the model.

Time series forecasting uses one or more forecasting models to regress on independent factors to produce a dependent factor. For example, if Tiger Woods has been playing golf very quickly, the speed of play is an example of an independent factor. A forecasting model regresses on historical data to predict the future play rates. The future play rate is a dependent factor.

SUMMARY

The illustrative embodiments provide a method, system, and computer program product for selecting forecasting model complexity using eigenvalues. An embodiment includes a method for selecting forecasting model complexity using eigenvalues. The embodiment represents a process in a model, wherein the model comprises a mathematical representation of the process in a certain degree, and wherein instructions encoding the mathematical representation execute using a processor and a memory in a data processing system. The embodiment selecting a first portion of historical data generated by the process during a first period, wherein the first portion comprises an actual value of an outcome of the process, and a value of a feature influencing the process during the first period. The embodiment making a prediction, wherein the prediction comprises a predicted value of the outcome. The embodiment determining a difference between the prediction and the actual value of the outcome. The embodiment representing the difference as a change in a distribution of eigenvalues. The embodiment selecting, according to the change in the distribution of the eigenvalues, a second model to represent the process, wherein the second model comprises a second mathematical representation of the process in a different degree.

Another embodiment includes a computer program product for selecting forecasting model complexity using eigenvalues. The embodiment further includes one or more computer-readable tangible storage devices. The embodiment further includes program instructions, stored on at least one of the one or more storage devices, to represent a process in a model, wherein the model comprises a mathematical representation of the process in a certain degree, and wherein instructions encoding the mathematical representation execute using a processor and a memory in a data processing system. The embodiment further includes program instructions, stored on at least one of the one or more storage devices, to select a first portion of historical data generated by the process during a first period, wherein the first portion comprises an actual value of an outcome of the process, and a value of a feature influencing the process during the first period. The embodiment further includes program instructions, stored on at least one of the one or more storage devices, to make a prediction, wherein the prediction comprises a predicted value of the outcome. The embodiment further includes program instructions, stored on at least one of the one or more storage devices, to determine a difference between the prediction and the actual value of the outcome. The embodiment further includes program instructions, stored on at least one of the one or more storage devices, to represent the difference as a change in a distribution of eigenvalues. The embodiment further includes program instructions, stored on at least one of the one or more storage devices, to select, according to the change in the distribution of the eigenvalues, a second model to represent the process, wherein the second model comprises a second mathematical representation of the process in a different degree.

2. Another embodiment includes a computer system for selecting forecasting model complexity using eigenvalues. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to represent a process in a model, wherein the model comprises a mathematical representation of the process in a certain degree, and wherein instructions encoding the mathematical representation execute using a processor and a memory in a data processing system. The embodiment further includes program instructions, stored on at least one of the one or more storage devices for execution by at least one of the one or more processors via at least one of the one or more memories, to select a first portion of historical data generated by the process during a first period, wherein the first portion comprises an actual value of an outcome of the process, and a value of a feature influencing the process during the first period. The embodiment further includes program instructions, stored on at least one of the one or more storage devices for execution by at least one of the one or more processors via at least one of the one or more memories, to make a prediction, wherein the prediction comprises a predicted value of the outcome. The embodiment further includes program instructions, stored on at least one of the one or more storage devices for execution by at least one of the one or more processors via at least one of the one or more memories, to determine a difference between the prediction and the actual value of the outcome. The embodiment further includes program instructions, stored on at least one of the one or more storage devices for execution by at least one of the one or more processors via at least one of the one or more memories, to represent the difference as a change in a distribution of eigenvalues. The embodiment further includes program instructions, stored on at least one of the one or more storage devices for execution by at least one of the one or more processors via at least one of the one or more memories, to select, according to the change in the distribution of the eigenvalues, a second model to represent the process, wherein the second model comprises a second mathematical representation of the process in a different degree.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a set of graphs representing models of differing complexities as used in conjunction with an illustrative embodiment;

FIG. 4 depicts an equation for eigenvalue as used in conjunction with an illustrative embodiment;

FIG. 5 depicts a block diagram of an example process of selecting forecasting model complexity using eigenvalues in accordance with an illustrative embodiment;

DETAILED DESCRIPTION

Figure 1:
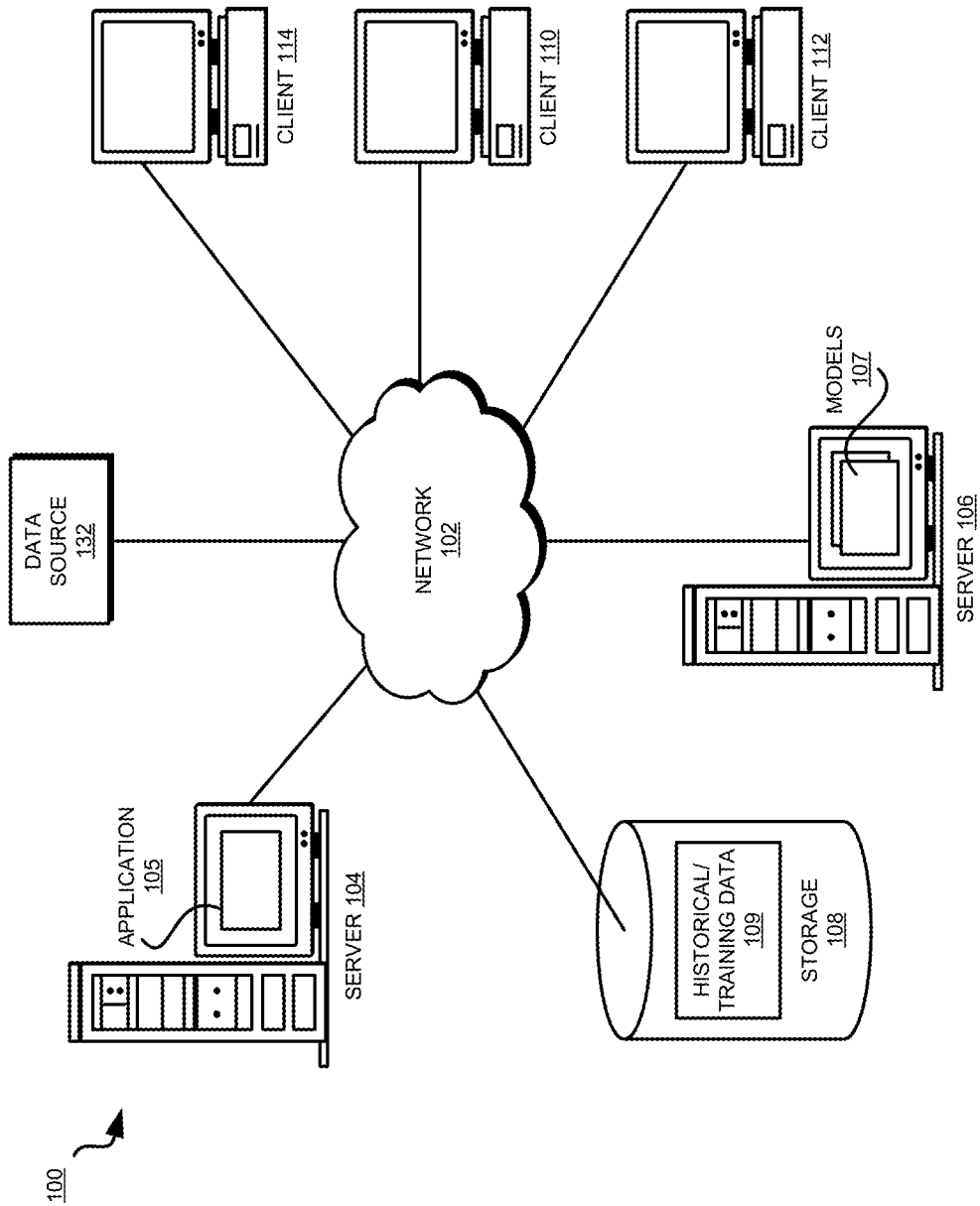
FIG. 1 depicts a block diagram of a network of data processing systems in which illustrative embodiments may be implemented.

The forecasting model that is applied to a given process is trained a priori based on the data of a set of factors that affect the process. As the process continues forwards in time, the relationship of independent factors to the predicted outcome can change. The illustrative embodiments recognize that when a difference between the predicted outcome and the actual outcome—the ground truth—exceeds a threshold, the difference is indicative of a change in the relationship between one or more factors and the outcome.

A forecasting model attempts to fit the observed outcomes to a generalized representation. For example, a linear model attempts to generalize the outcomes as exhibiting a linear characteristic and fitting a line represented by an equation of the first degree. Similarly, a quadratic model attempts to generalize the outcomes as fitting a curve represented by an equation of the second degree. Likewise, a cubic model attempts to generalize the outcomes as fitting a curve represented by an equation of the third degree.

The illustrative embodiments recognize that a lower order model, e.g., a linear model, attempting to forecast an outcome that exhibits, for example, quadratic behavior, will produce significantly erroneous forecasted outcome. The illustrative embodiments also recognize that a higher order model, e.g., a cubic model, attempting to forecast an outcome that exhibits, for example, linear behavior, will incur undesirably high computational costs to forecast the outcomes. In other words, an under-fitting model causes significantly erroneous predictions, and an over-fitting model incurs undesirably high costs.

The illustrative embodiments recognize that when the differences between the predicted outcome and the ground truths becomes very large, i.e. exceed a threshold, a model of higher order than the order of the model in use is needed to maintain accurate predictions. Conversely, when the predicted outcomes fit the ground truths exceptionally well, i.e., below a threshold amount of variation, it is desirable to check whether a lower order model will also produce acceptable predictions with reduced costs, i.e., whether the difference between the predictions of the lower order model and the ground truths will still be below the threshold.

The illustrative embodiments used to describe the invention generally address and solve the above-described problems and other problems related to managing the accuracy and cost of predicting process outcomes. The illustrative embodiments provide a method, system, and computer program product for selecting forecasting model complexity using eigenvalues.

An embodiment describes a forecasting model as a matrix. The embodiment describes a factor affecting the model as a vector. The embodiment determines an eigenvalue that determines the difference between the predicted outcomes of the model and the values of the actual observed outcomes during a portion of the historical data of the process.

An embodiment defines one or more thresholds for comparing the eigenvalue. Each range of eigenvalues relative to the one or more thresholds corresponds to a model of a different complexity. The various models of different complexities are usable to forecast the process, with the factor associated with the eigenvalue influencing the outcome of the process. For example, with a single threshold T, the eigenvalue can be in one of two ranges—up to T or exceed T. Accordingly, one of two models of different complexities, e.g., one linear model and one quadratic model, can be chosen according to where the eigenvalue lies relative to T.

Similarly, with two thresholds A and B, the eigenvalue can be in one of three ranges—up to A, between A and B, and exceed B. Accordingly, one of three models of different complexities, e.g., one linear model, one quadratic model, and one cubic model, can be chosen according to where the eigenvalue lies relative to A and B. An embodiment can use any number of thresholds, any number of eigenvalue ranges defined by the thresholds, and any number of models of different complexities corresponding to the ranges in a similar manner without limitation.

Another embodiment measures not only the differences between the predicted outcomes and the actual outcomes over the portion of the historical data, but also a rate of change in the eigenvalues. For example, the embodiment determines that faster than a threshold rate of change in the eigenvalues corresponding to a factor is indicative of the dependency of the process on the factor increasing in complexity, e.g., from linear dependency to a quadratic dependency or from a quadratic dependency to a cubic dependency, and vice-versa. This rate of change can then be used to identify anomalies in the process that generates the data, by comparing the current rate of change with the previous history of fits to the data.

The illustrative embodiments are described with respect to certain data, processes, factors, thresholds, rates, structures, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
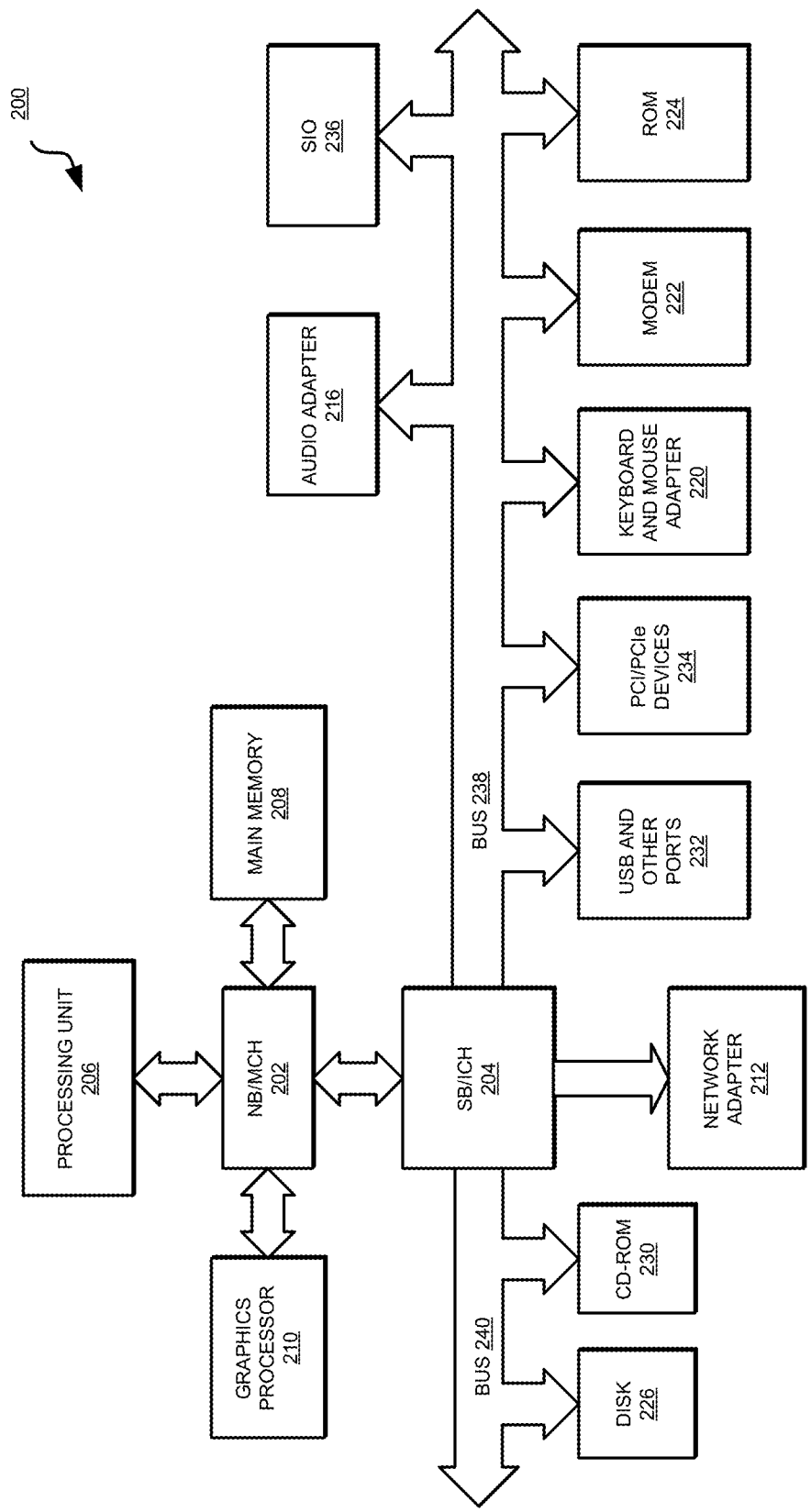
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, Application 105 in server 104 implements an embodiment described herein. Historical data 109 in storage 108 is an example of past predictions and outcomes of a process, and is usable for training a model according to an embodiment herein. Historical data 109 is also usable for determining a difference between predicted outcomes and actual outcomes as described with respect to an embodiment herein. Models 107 in server 106 is a collection of models of varying complexities for the process of historical data 109 and any number of other processes. Data source 132 comprises any number of data sources that are accessible over network 102 and provide outcome data, e.g., a time series, of a process. For example, in one embodiment, data source 132 provides the time series of outcomes that is stored along with the corresponding predictions made by one of models 107 as historical data 109. In one embodiment, data source 132 is an example of a local data source, for example, accessible over a bus or a local area network. In another embodiment, data source 132 is an example of an external data source, for example, accessible over a wide area network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 and models 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1 and 2 and above-described examples are not meant to imply architectural limitations. For example, data processing system 200 also may be a tablet computer, laptop computer, or telephone device in addition to taking the form of a PDA.

With reference to FIG. 3, this figure depicts a set of graphs representing models of differing complexities as used in conjunction with an illustrative embodiment. Graph 302 depicts a linear model showing curve (line) 304 approximating the points representing the outcomes of an example process over a period. Graph 312 depicts a quadratic model showing curve 314 approximating the points representing the outcomes of an example process over a period. Graph 322 depicts a cubic model showing curve 324 approximating the points representing the outcomes of an example process over a period. Other more complex graphs can similarly approximate the outcome plots with more complex curves.

With reference to FIG. 4, this figure depicts an equation for eigenvalue as used in conjunction with an illustrative embodiment. Matrix "A" is any suitable matrix to represent a selected model. Vector x is a representation of factor x influencing the process of model A. $\lambda$ is the eigenvalue that scales vector x. Eigenvalue $\lambda$ represents the difference between the predicted outcome and the actual outcome of the process of model A when the factor corresponding to vector x changes.

With reference to FIG. 5, this figure depicts a block diagram of an example process of selecting forecasting model complexity using eigenvalues in accordance with an illustrative embodiment. Process 500 can be implemented in application 105 in FIG. 1.

Data stream 502 is a time series corresponding to a modeled process. Data stream 502 is multi-dimensional in that the data in data stream comprises outcomes, any number of factors, and predictions associated with the process over time. Data stream 502 can includes historical data and near real time data from the process as the process transpires in real time.

As one example, one can assume that sliding window 504 covers historical portion of data stream 502, such as historical data 109 in FIG. 1, and data window 506 covers the data as will result from the progression of process in the future. As another example, one can assume that sliding window 504 covers historical portion of data stream 502 during one past period, and data window 506 covers historical portion of data stream 502 during a later period, but also a past period.

An embodiment, such as in application 105 in FIG. 1, estimates, configures, or selects a model of some complexity level (block 512). For example, in one embodiment, the information about the model used during sliding window 504, and information about a factor affecting the model, is available in data stream 502 or elsewhere. Another embodiment determines a factor affecting the outcome in the data of window 504, and configures or estimates a model of certain complexity from the data in sliding window 504. The model estimated, configured, or selected in block 512 can be of any suitable complexity, e.g., of linear complexity.

The embodiment computes a prediction error (block 514). For example, the embodiment determines a difference between a prediction made by the model of block 512 for the time duration of data window 506 and the actual outcomes during data window 506. Using the differences, the embodiment determines a quality of fit between the predictions and the actual outcomes of window 506 (block 516).

Alternatively, an embodiment computes one or more eigenvalues corresponding to one or more changes in the factor of the model where the prediction errors are found in block 514 (block 518). The embodiment computes the changes in the eigenvalues corresponding to the changes in the factor over any number of windows like windows 504 and 506 (block 520).

An embodiment further uses the changes in the eigenvalues for other computations. For example, the embodiment computes a rate of change in the eigenvalues from one window to another. Variations in the rate of change of eigenvalues are indicative of changing complexity of the relationship of the factor to the model. For example, a change from a linear relationship between the factor and the model to a quadratic relationship between the factor and the model will be reflected by a difference in the rate of change of the eigenvalues.

Using the estimated quality of the fit from block 516, the detected changes in the eigenvalues from block 520, separately or together, an embodiment adjusts a complexity of the model estimated, configured, or selected in block 512 (block 522). For example, one embodiment selects a model of a different complexity, and adjusts the parameters of the new model according to the eigenvalues, the changes in the eigenvalues, or a combination thereof. The embodiment tests the new model with its configured parameters on another window of data stream 502.

An embodiment iterates through any number of iterations of selecting and adjusting the model in this manner until the predictions of the model match the outcomes in data stream 502 within a tolerance.

Using the changes in the eigenvalues from block 520, an embodiment can further determine where or when the inflections can be expected in data stream 502 (block 524). An inflection is a change that is greater than a threshold. For example, if during one or more iterations described above, the embodiment determines that the outcome or a second factor in data stream 502 exhibits an inflection when the factor or the corresponding eigenvalue exhibit a certain change or trend of change, the embodiment can forecast an upcoming inflection point in the outcome or the second factor when the factor exhibits a similar trend during another window of data stream 502. The forecasting of inflection points can contribute to the selection of a model of a different complexity, adjustment of a model's parameters, or both, so that the different or adjusted model continues to predict accurately through the inflection point. For example, if the inflection point is such that the relationship between the second factor and the model goes from quadratic before the inflection point to cubic after the inflection point, changing the model at the inflection point according to this changing relationship maintains the accuracy of the predictions through the inflection point.

Figure 6:
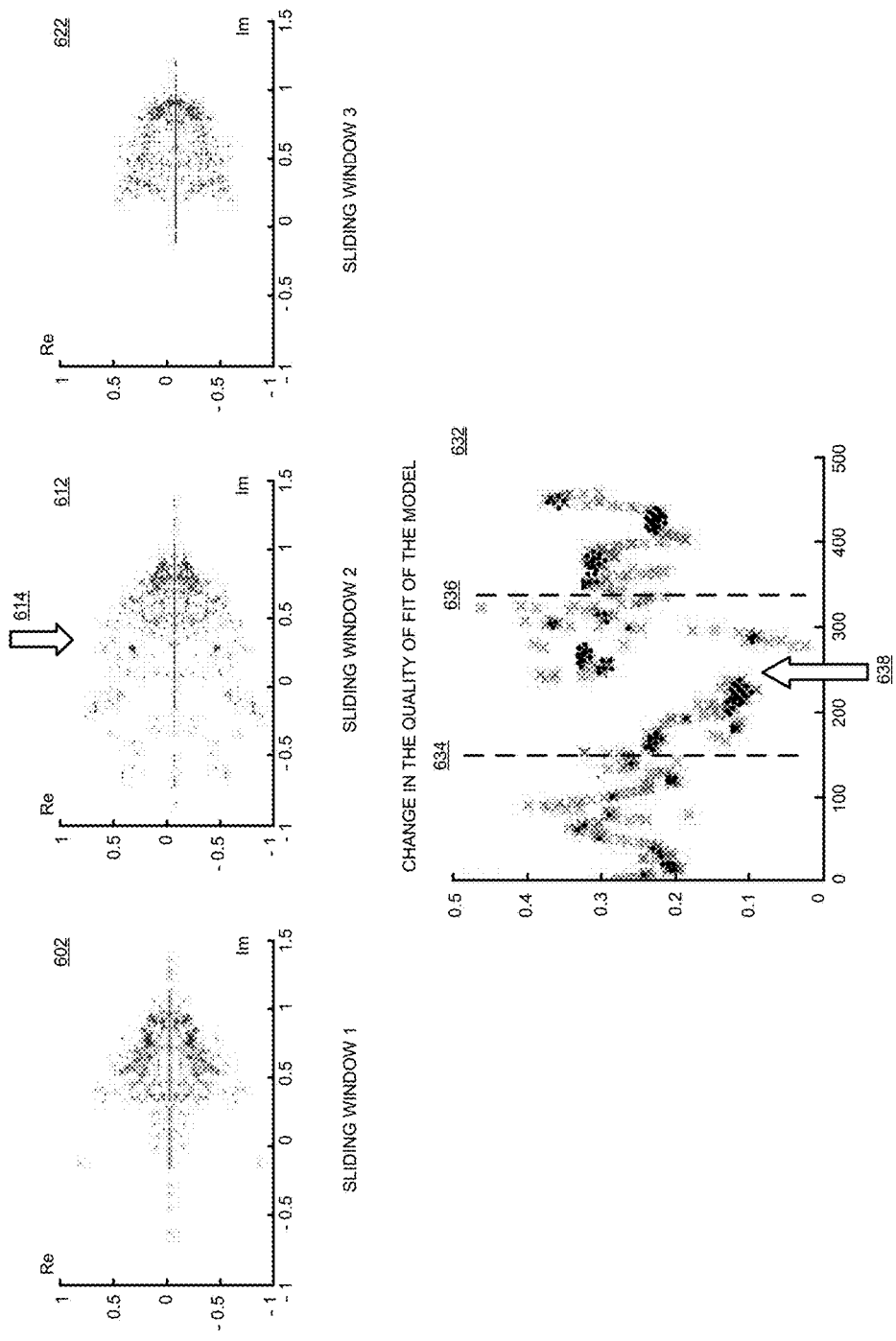
FIG. 6 depicts a set of graph plots depicting a relationship between the changes in the eigenvalues and the quality of the fit of the model in accordance with an illustrative embodiment.

With reference to FIG. 6, this figure depicts a set of graph plots depicting a relationship between the changes in the eigenvalues and the quality of the fit of the model in accordance with an illustrative embodiment. Real (Re) and imaginary (Im) components of the eigenvalues plotted in graphs 602, 612, and 622 are generated by application 105 of FIG. 1, such as in blocks 518 and 520 of process 500 of FIG. 5.

An embodiment can be configured to use an above-threshold change in the eigenvalues corresponding to a factor in the model to trigger adjustments to the complexity and parameters of the selected model. An embodiment can also be configured to use an above-threshold change in fit of the given model to the given data stream, to make adjustments to the complexity and parameters of the selected model. An embodiment can also be configured to use both—an above-threshold change in the eigenvalues and an above-threshold change in fit of the given model to make adjustments to the complexity and parameters of the selected model.

Graph 602 depicts a plot of real and imaginary components of eigenvalues corresponding to a factor in the data of a first sliding window, e.g., window 504 in FIG. 5. Graph 612 depicts a plot of real and imaginary components of eigenvalues corresponding to the same factor in the data of a second sliding window, e.g., window 506 in FIG. 5. Graph 622 depicts a plot of real and imaginary components of eigenvalues corresponding to the same factor in the data of a third sliding window, e.g., during a window (not shown) after window 506 in FIG. 5.

Graph 632 depicts a plot of actual outcomes (marked as x) and predicted outcomes (marked as o) during sliding windows of graphs 602, 612, and 622. The plots to the left of line 634 and up to line 634 indicate the fit of predictions and outcomes during sliding window 1 of graph 602. The plots to the right of line 634 and up to line 636 indicate the fit of predictions and outcomes during sliding window 2 of graph 612. The plots to the right of line 636 indicate the fit of predictions and outcomes during sliding window 3 of graph 622.

A point in time during sliding window 2 of graph 612 is marked with arrow 614, and corresponds with the time marked with arrow 634. Graph 612 shows greater scattering of the eigenvalues as compared to graphs 602 and 622, particularly at time 614. Correspondingly, the plots of actual outcomes (x) and predictions (o) also show fewer overlaps between lines 634 and 636, and particularly at time 638, as compared to the plots left of line 634 or right of line 636. The fewer overlaps between lines 634 and 636 is an indication of poorer model fit in sliding window 2 as compared to the fit of the model in sliding windows 1 and 3.

Thus, an embodiment can be configured to use either an above threshold change in the eigenvalues, as in graph 612, or an above threshold change in fit of the given model as in graph 632, or both, to make adjustments to the complexity and parameters of the selected model.

Figure 7:
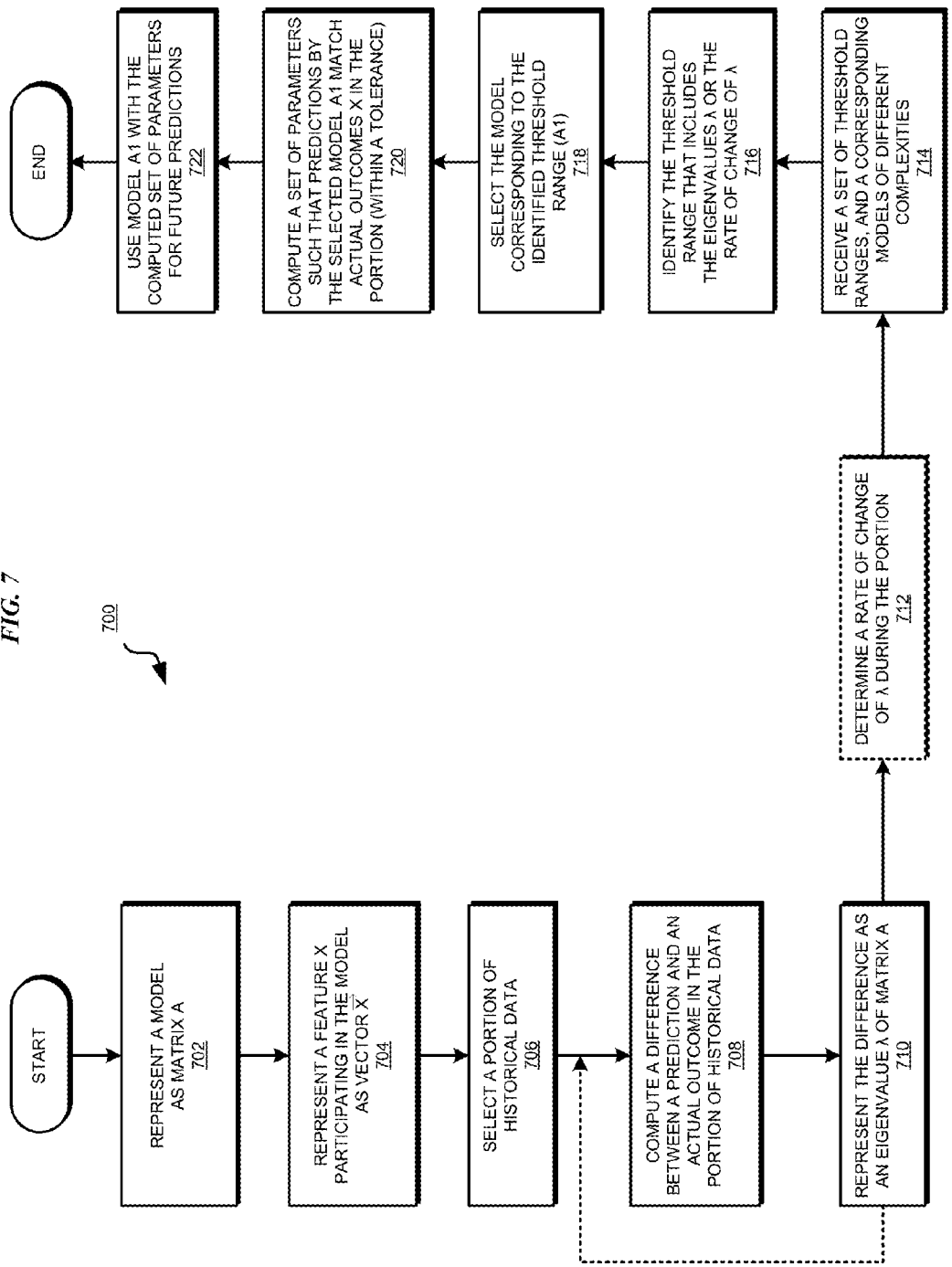
FIG. 7 depicts a flow chart of an example process for selecting forecasting model complexity using eigenvalues in accordance with an illustrative embodiment.

With reference to FIG. 7, this figure depicts a flow chart of an example process for selecting forecasting model complexity using eigenvalues in accordance with an illustrative embodiment. Process 700 can be implemented in application 105 in FIG. 1.

The application forms, estimates, or computes a representation of a model in the form of a matrix—matrix A (block 702). The application further forms, estimates, or computes a representation of a feature x in the form of vector x—a vector model of feature x, where feature x participates in the model (block 704).

The application selects a portion of historical data of a process that is modeled by model A (block 706). Using matrix A and vector x, the application computes a difference between a prediction and an actual outcome in the portion of the historical data (block 708). The application represents the difference as an eigenvalue λ of matrix A (block 710). The application performs blocks 708 and 710 for as many points of differences as needed in a particular implementation. Optionally, when basing some computations on a rate of change of the eigenvalues, e.g., as in block 520 in FIG. 5, the application also computes the rate of change of the eigenvalues (block 712).

The application receives a set of ranges for the eigenvalues defined by a set of one or more thresholds (the ranges are referred to as threshold ranges) (block 714). The set of threshold ranges corresponds to a set of models of different complexities, each model modeling the same process as the model of matrix A. For example, one threshold range between two thresholds corresponds to one model of a specific complexity; another threshold range between different thresholds corresponds to another model of a different complexity, and so on.

The application identifies the threshold range that includes the eigenvalue λ (block 716). When using the rate of change of λ computed in block 712, the application determines the threshold range that includes the rate of change of λ in block 716.

The application selects the model corresponding to the identified threshold range, such as a model that can be represented as matrix A1 (block 718). The application then computes the parameters of the model, such as coefficients and/or constants in the model's equation, such that the predictions made by model A1 with those parameters match the actual predictions in the portion of the historical data (block 720). The predictions are deemed to have matched the actual outcomes when their respective values are within a tolerance limit of one another.

The application then tests the accuracy of the selected model A1 having the computes parameters for making future predictions for the process (block 722). The future predictions may be for a later portion of historical data, or for a portion of the data stream that has not yet occurred. The application ends process 700 thereafter.

Thus, a computer implemented method, system, and computer program product are provided in the illustrative embodiments for selecting forecasting model complexity using eigenvalues.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for selecting forecasting model complexity using eigenvalues, the method comprising:
   representing a process in a model, wherein the model comprises a first mathematical representation of the process in a first degree, wherein the first degree is indicative of a complexity of the first mathematical representation, and wherein instructions encoding the first mathematical representation execute using a processor and a memory in a data processing system;
   selecting a first portion of historical data generated by the process during a first period, wherein the first portion comprises an actual value of an outcome of the process, and a value of a feature influencing the process during the first period;
   making a prediction, wherein the prediction comprises a predicted value of the outcome during a first prediction window;
   determining a difference between the prediction and the actual value of the outcome during the first prediction window;
   representing the difference as a change in a distribution of eigenvalues;
   forecasting, using a processor and a memory, from a trend of the difference as represented by the change in the distribution of eigenvalues, an inflection in the feature during a second prediction window, wherein the inflection is indicative of a relationship between the feature and the first model changing to a different order relationship than the first model after a point of the inflection;
   selecting, according to the change in the distribution of the eigenvalues, a second model to represent the process, wherein the second model comprises a second mathematical representation of the process in a second degree different from the first degree, wherein the second degree is indicative of a complexity of the second mathematical representation; and
   adjusting, using the processor and the memory, according to the forecasted inflection, a parameter of the second model, the adjusting causing the second model to maintain a prediction accuracy through the inflection during the second prediction window.

2. The method of claim 1, further comprising:
   adjusting a set of parameters corresponding to the second model to form an adjusted second model, wherein the adjusted second model produces a second prediction, wherein the second prediction comprises a second predicted value of the outcome; and
   accepting the adjusted second model as representative of the process, responsive to determining that the second prediction is within a tolerance limit of the actual value of the outcome.

3. The method of claim 2, wherein the adjusting makes adjustments to the set of parameters, further comprising:
   comparing the adjustments to an instance of previous adjustments to the set parameters; and
   reporting, responsive to a difference between the adjustments and the previous adjustments exceeding a threshold, an anomaly in a data-generation process.

4. The method of claim 1, further comprising:
   determining a level of fit between the model and the process, the level of the fit corresponding to the difference between the prediction and the actual value of the outcome; and
   selecting a third model from a plurality of models, wherein each model in the plurality of models corresponds to a different level of fit.

5. The method of claim 1, further comprising:
   representing the model as a matrix of values.

6. The method of claim 1, further comprising:
   representing the feature as a vector.

7. The method of claim 1, further comprising:
   comparing the eigenvalues to at least one threshold, wherein the at least one threshold defines a plurality of ranges of eigenvalues, wherein the comparing identifies a range from the plurality of ranges, and wherein the identified range includes an eigenvalues from the eigenvalues;
   selecting the second model from a plurality of models, wherein a model in the plurality of models corresponds to a range in the plurality of ranges.

8. The method of claim 7, wherein each model in the plurality of models represents the process with a mathematical representation in a different degree, wherein a degree in a particular mathematical representation is indicative of a complexity of the particular mathematical representation.

9. A computer program product for selecting forecasting model complexity using eigenvalues, the computer program product comprising:
a computer readable storage medium;
program instructions, stored on the computer readable storage medium, to represent a process in a model, wherein the model comprises a first mathematical representation of the process in a first degree, wherein the first degree is indicative of a complexity of the first mathematical representation, and wherein instructions encoding the first mathematical representation execute using a processor and a memory in a data processing system;
program instructions, stored on the computer readable storage medium, to select a first portion of historical data generated by the process during a first period, wherein the first portion comprises an actual value of an outcome of the process, and a value of a feature influencing the process during the first period;
program instructions, stored on the computer readable storage medium, to make a prediction, wherein the prediction comprises a predicted value of the outcome during a first prediction window;
program instructions, stored on the computer readable storage medium, to determine a difference between the prediction and the actual value of the outcome during the first prediction window;
program instructions, stored on the computer readable storage medium, to represent the difference as a change in a distribution of eigenvalues;
program instructions, stored on the computer readable storage medium, to forecast, using a processor and a memory, from a trend of the difference as represented by the change in the distribution of eigenvalues, an inflection in the feature during a second prediction window, wherein the inflection is indicative of a relationship between the feature and the first model changing to a different order relationship than the first model after a point of the inflection;
program instructions, stored on the computer readable storage medium, to select, according to the change in the distribution of the eigenvalues, a second model to represent the process, wherein the second model comprises a second mathematical representation of the process in a second degree different from the first degree, wherein the second degree is indicative of a complexity of the second mathematical representation; and
program instructions, stored on the computer readable storage medium, to adjust, according to the forecasted inflection, a parameter of the second model, the adjusting causing the second model to maintain a prediction accuracy through the inflection during the second prediction window.

10. The computer program product of claim 9, further comprising:
program instructions, stored on the computer readable storage medium, to adjust a set of parameters corresponding to the second model to form an adjusted second model, wherein the adjusted second model produces a second prediction, wherein the second prediction comprises a second predicted value of the outcome; and
program instructions, stored on the computer readable storage medium, to accept the adjusted second model as representative of the process, responsive to determining that the second prediction is within a tolerance limit of the actual value of the outcome.

11. The computer program product of claim 10, wherein the program instructions to adjust makes adjustments to the set of parameters, further comprising:
program instructions, stored on the computer readable storage medium, to compare the adjustments to an instance of previous adjustments to the set parameters; and
program instructions, stored on the computer readable storage medium, to report, responsive to a difference between the adjustments and the previous adjustments exceeding a threshold, an anomaly in a data-generation process.

12. The computer program product of claim 9, further comprising:
program instructions, stored on the computer readable storage medium, to determine a level of fit between the model and the process, the level of the fit corresponding to the difference between the prediction and the actual value of the outcome; and
program instructions, stored on the computer readable storage medium, to select a third model from a plurality of models, wherein each model in the plurality of models corresponds to a different level of fit.

13. The computer program product of claim 9, further comprising:
program instructions, stored on the computer readable storage medium, to represent the model as a matrix of values.

14. The computer program product of claim 9, further comprising:
program instructions, stored on the computer readable storage medium, to represent the feature as a vector.

15. The computer program product of claim 9, further comprising:
program instructions, stored on the computer readable storage medium, to compare the eigenvalues to at least one threshold, wherein the at least one threshold defines a plurality of ranges of eigenvalues, wherein the comparing identifies a range from the plurality of ranges, and wherein the identified range includes an eigenvalues from the eigenvalues;
program instructions, stored on the computer readable storage medium, to select the second model from a plurality of models, wherein a model in the plurality of models corresponds to a range in the plurality of ranges.

16. The computer program product of claim 15, wherein each model in the plurality of models represents the process with a mathematical representation in a different degree, wherein a degree in a particular mathematical representation is indicative of a complexity of the particular mathematical representation.

17. A computer system for selecting forecasting model complexity using eigenvalues, the computer system comprising:
one or more processors, one or more computer-readable memories and a computer readable storage medium;
program instructions, stored on the computer readable storage medium for execution by at least one of the one or more processors via at least one of the one or more memories, to represent a process in a model, wherein the model comprises a first mathematical representation of the process in a first degree, wherein the first degree is indicative of a complexity of the first mathematical representation, and wherein instructions encoding the first mathematical representation execute using a processor and a memory in a data processing system;

program instructions, stored on the computer readable storage medium for execution by at least one of the one or more processors via at least one of the one or more memories, to select a first portion of historical data generated by the process during a first period, wherein the first portion comprises an actual value of an outcome of the process, and a value of a feature influencing the process during the first period;

program instructions, stored on the computer readable storage medium for execution by at least one of the one or more processors via at least one of the one or more memories, to make a prediction, wherein the prediction comprises a predicted value of the outcome during a first prediction window;

program instructions, stored on the computer readable storage medium for execution by at least one of the one or more processors via at least one of the one or more memories, to determine a difference between the prediction and the actual value of the outcome during the first prediction window;

program instructions, stored on the computer readable storage medium for execution by at least one of the one or more processors via at least one of the one or more memories, to represent the difference as a change in a distribution of eigenvalues;

program instructions, stored on the computer readable storage medium for execution by at least one of the one or more processors via at least one of the one or more memories, to forecast from a trend of the difference as represented by the change in the distribution of eigenvalues, an inflection in the feature during a second prediction window, wherein the inflection is indicative of a relationship between the feature and the first model changing to a different order relationship than the first model after a point of the inflection;

program instructions, stored on the computer readable storage medium for execution by at least one of the one or more processors via at least one of the one or more memories, to select, according to the change in the distribution of the eigenvalues, a second model to represent the process, wherein the second model comprises a second mathematical representation of the process in a second degree different from the first degree, wherein the second degree is indicative of a complexity of the second mathematical representation; and program instructions, stored on the computer readable storage medium for execution by at least one of the one or more processors via at least one of the one or more memories, to adjust, according to the forecasted inflection, a parameter of the second model, the adjusting causing the second model to maintain a prediction accuracy through the inflection during the second prediction window.

18. The computer system of claim 17, further comprising:

program instructions, stored on the computer readable storage medium for execution by at least one of the one or more processors via at least one of the one or more memories, to adjust a set of parameters corresponding to the second model to form an adjusted second model, wherein the adjusted second model produces a second prediction, wherein the second prediction comprises a second predicted value of the outcome; and program instructions, stored on the computer readable storage medium for execution by at least one of the one or more processors via at least one of the one or more memories, to accept the adjusted second model as representative of the process, responsive to determining that the second prediction is within a tolerance limit of the actual value of the outcome.

\* \* \* \* \*